United States Patent [19]

Ross et al.

[11] Patent Number: 5,431,008
[45] Date of Patent: Jul. 11, 1995

[54] ACTIVE CONTROL OF MACHINE PERFORMANCE

[75] Inventors: Colin F. Ross, Stapleford; Andrew J. Langley, Welwyn; Graham P. Eatwell, Calde Cote, all of England

[73] Assignee: Noise Cancellation Technologies, Inc., Linthicum, Md.

[21] Appl. No.: 920,495

[22] PCT Filed: Feb. 2, 1991

[86] PCT No.: PCT/GB91/00266
§ 371 Date: Aug. 20, 1992
§ 102(e) Date: Aug. 20, 1992

[87] PCT Pub. No.: WO91/13243
PCT Pub. Date: Sep. 5, 1991

[30] Foreign Application Priority Data

Feb. 21, 1990 [GB] United Kingdom ............... 9003959

[51] Int. Cl.⁶ .............................................. F02C 9/00
[52] U.S. Cl. .................................... 60/39.33; 60/725; 415/119
[58] Field of Search ............... 60/39.24, 39.33, 725; 415/119; 364/151; 123/1 R, 476, 192.1

[56] References Cited

U.S. PATENT DOCUMENTS

| 3,936,606 | 2/1976 | Wanke ................... 415/119 |
| 4,557,106 | 12/1985 | Williams et al. ........... 60/725 |
| 4,805,733 | 2/1989 | Kato et al. . |
| 4,967,550 | 11/1990 | Acton et al. ............. 415/119 |

FOREIGN PATENT DOCUMENTS

| 278033 | 8/1988 | European Pat. Off. . |
| WO8907701 | 8/1989 | European Pat. Off. . |
| 2192937 | 1/1988 | United Kingdom . |
| 2203488 | 10/1988 | United Kingdom . |

OTHER PUBLICATIONS

Patent Abstracts of Japan vol. 10 No. 246 (M-510) 2302 23 Aug. 1986 and JP-A-61 76721 (Mazda) 19 Apr. 1986.
Adaptive systens in Control and Signal Processing Jul. 1986, Pergamon Press Oxford KJ Ostrom "A stochastic gradient algorithm for multichannel active sound control" pp. 329-333 (cited in the application).
Patent Abstracts of Japan vol. 12, No. 315 (M-735) 3162 26 Aug. 1988, and JP-A-63 85217 (Masashi Tsuchida) 15 Apr. 1988.
Patent Abstracts of Japan vol. 013 No. 41 (M-791) (3389) 30 Jan. 1989 and JP-A-63 248918 (Mazda) 17 Oct. 1988.
Patent Abstracts of Japan, vol. 013 No. 330 (-E-793) 25 Jul. 1989, and JP-A-1 036911 (Sankei KoGYO) 07 Feb. 1989.
Patent Abstracts of Japan vol. 9 No. 70 (M-367 1793 30 Mar. 1985, and JP-A-59 201915 (Hino Jidosha Kogyo) 15 Nov. 1984.

*Primary Examiner*—Louis J. Casaregola
*Attorney, Agent, or Firm*—James W. Hiney

[57] ABSTRACT

A control system is described for improving continuous dynamical control on the pressure in the outlet or inlet system (3) or both of a machine (1) in order to control the performance of the machine. The system comprises an actuator (4) for varying the pressure in the selected system, a sensor (8) for monitoring the operation of the machine and producing a signal indicative thereof, and control means (5) responsive to the sensor signals for driving the actuator, wherein the control means operates to adjust the machine performance according to predetermined data, to optimise the machine performance. The data may be in a memory (look-up table) or the control means may operate in accordance with an algorithm. A second sensor may be provided to generate a signal indicative of sound produced by one or other or both of the outlet and inlet systems to produce signals to enable the control means simultaneously to reduce noise generated by the machine as well as to improve the performance of the machine by active feedback.

14 Claims, 3 Drawing Sheets

ACTIVE CONTROL OF MACHINE PERFORMANCE

FIELD OF THE INVENTION

This invention relates to active control systems for increasing the performance of machines by active control techniques applied to the inlet or outlet systems. The invention may also be applied to reduce radiated noise from the machine whilst operating.

BACKGROUND TO THE INVENTION

The efficiency and performance of internal combustion engines has been the focus of a great deal of attention over the years. There are many parameters which affect the performance of an engine whether it be two-stroke, four-stroke, petrol or Diesel, of normal reciprocating type or of one of its derivatives such as a Wankel engine.

One feature of all internal combustion engines is the need to draw fuel and air into a combustion chamber and to expel burnt gases after combustion has taken place. Apart from the design of the mechanical components such as valves, pistons and combustion chambers, the shape of the inlet and exhaust manifolds has been shown to be important. This is because the shape affects the pressure difference between the combustion chamber and the inlet or exhaust. It is this pressure difference which forces the air/fuel mixture into the chamber, or the burnt gases out of the chamber. The function of turbo-chargers and superchargers, for example, is to increase the pressure in the inlet. The pressure difference between the combustion chamber and inlet or exhaust varies with time throughout the cycle of the engine, and so the complete time histories of the pressure differences can effect engine performance, and not just their time averages, for example.

The design of exhaust pipes and inlet systems is also constrained by the requirement that they must reduce the sound radiated from the engine to acceptable levels. This requirement is becoming increasingly stringent and is often in conflict with the desire for good performance and efficiency.

The 'tuning' of exhaust pipes, especially for two stroke engines, is a way of influencing the unsteady pressure in the exhaust but, since the tuning is achieved by the fixed exhaust geometry, the tuning cannot be effective at all engine speeds.

Over the last twenty years there has been a development of active control systems which can be applied to reduce the sound radiated from the end of exhaust pipes. These control systems work by reflecting the sound wave in the pipe back towards the engine. They allow shorter and more direct pipes to be used and so affect the efficiency of the engine under some operating conditions, however they can induce strong acoustic resonances in the exhaust pipe which can lead to increased noise radiation from the walls of the pipe.

The use of two actuators to absorb the sound in a pipe rather than to reflect it is known. However, the technique uses a single channel control system and relies on using actuators with a matched response. It is not suitable for practical applications where the response of the individual actuators can vary over a period of time.

There are other machines which have inlet and outlet systems and whose performance is affected by the dynamic pressures in those systems. Examples include gas compressors (which include screw, tooth, reciprocating and centrifugal types), pumps, turbo-machines etc. The performance of these can be measured in different ways (such as mass flow rate, power output, efficiency etc) and, as with internal combustion engines, there is often a conflicting requirement for noise reduction.

DISCUSSION OF SELECTED THE PRIOR ART

The attenuation of sound radiated from the open end of an exhaust pipe by the use of active control is known. In such systems, a loudspeaker upstream of the exit is used to generate an 'anti-sound' which, in fact, reflects the sound travelling down the exhaust pipe back towards the engine, thereby preventing the sound from being radiated at the exit. A microphone at the exit is used to monitor the sound there, and its signal is processed to adapt the loudspeaker signal in order to maintain silence at the exit as engine speed or conditions change.

One disadvantage of this type of system is that the sound level in the exhaust pipe upstream of the control loudspeaker can become large at some frequencies when the system is at resonance. This can lead to enhanced sound radiation from the walls of the exhaust pipe.

Such a system can control only the unsteady pressure (the sound) at the exit of the exhaust pipe. The unsteady pressure in the exhaust manifold close to the engine is not under control, and therefore it is not possible independently to manipulate the unsteady pressure in the exhaust manifold in such a way as to improve the engine efficiency. There may be an improvement in engine efficiency because the average pressure at the exhaust manifold is affected by the geometrical configuration of the exhaust, but this configuration is not under dynamic control.

Another well-known configuration for active control of sound travelling in a duct is described in Swinbanks (UK Patent 1456018) in which at least two loudspeakers are controlled in such a way that sound propagating in a duct (such as an exhaust pipe) is absorbed. This not only prevents sound from being radiated from the exit of the pipe, but it also stops the reflection of the sound back towards the engine. This type of system therefore does not suffer from the enhanced radiation from the pipe walls described above. However, the characteristics of the actuators are assumed to remain fixed, and this is not practical for real systems where characteristics do change. Once again, the unsteady pressure at the engine exhaust manifold is not under independent control, and so it is impossible independently to exploit any gain in engine efficiency that might be obtained by controlling that unsteady pressure.

SUMMARY OF THE INVENTION

According to the invention there is provided a control system for improving continuous dynamical control of the pressure in at least one of the outlet and inlet systems of a machine in order to control the performance of the machine, comprising:

actuator means generating sound adapted to vary the unsteady dynamic pressure in the said inlet and/or outlet system;

at least one sensor means monitoring the operation of the machine and producing a signal indicative of the machine operation; and control means responsive to the sensor signals and adapted to generate therefrom signals for driving the said actuator means;

characterised in that the control means operates adaptively to adjust the machine performance according to an algorithm to optimise the machine performance, a model relating the sensor signals to the machine performance being incorporated into the adaptationprocess of the control means so that the model is updated with change in machine characteristics.

The control means is preferably responsive to the sensor signals to generate therefrom unsteady signals fluctuating at a rate characteristic of the sound in the machine for driving the said actuator means.

The system may further comprise:
second sensor means which generates a signal indicative of sound produced by at least one of the outlet and inlet systems,
and wherein the control means is also responsive to the signals from the second sensor means, and is adapted by active feedback simultaneously to reduce noise generated by the machine as well as to improve the performance of the machine.

Preferably the control means is supplied with a synchronising signal to synchronise the control means in relation to the operation of the machine.

Optionally the first sensor means comprises pressure sensors in each or both of the outlet and inlet manifolds of the machine.

The invention will now be described by way of example with reference to the accompanying drawings.

IN THE DRAWINGS

FIG. 1 is a block schematic diagram of an example of the invention where only the performance is improved, FIG. 2 is a block schematic diagram of an example of the invention where the performance and radiated noise is improved, and FIG. 3 is a block schematic diagram of an example of the invention where the performance and radiated noise are improved together with the vibration-induced shell noise.

DETAILED DESCRIPTION OF THE PREFERRED EMBODIMENTS

By way of example, various embodiments of the invention for use with an internal combustion engine are described below in sections a–c. This is followed, in section d by description of the invention as applied to an air compressor.

a) Improvements of Performance

Figure 1:
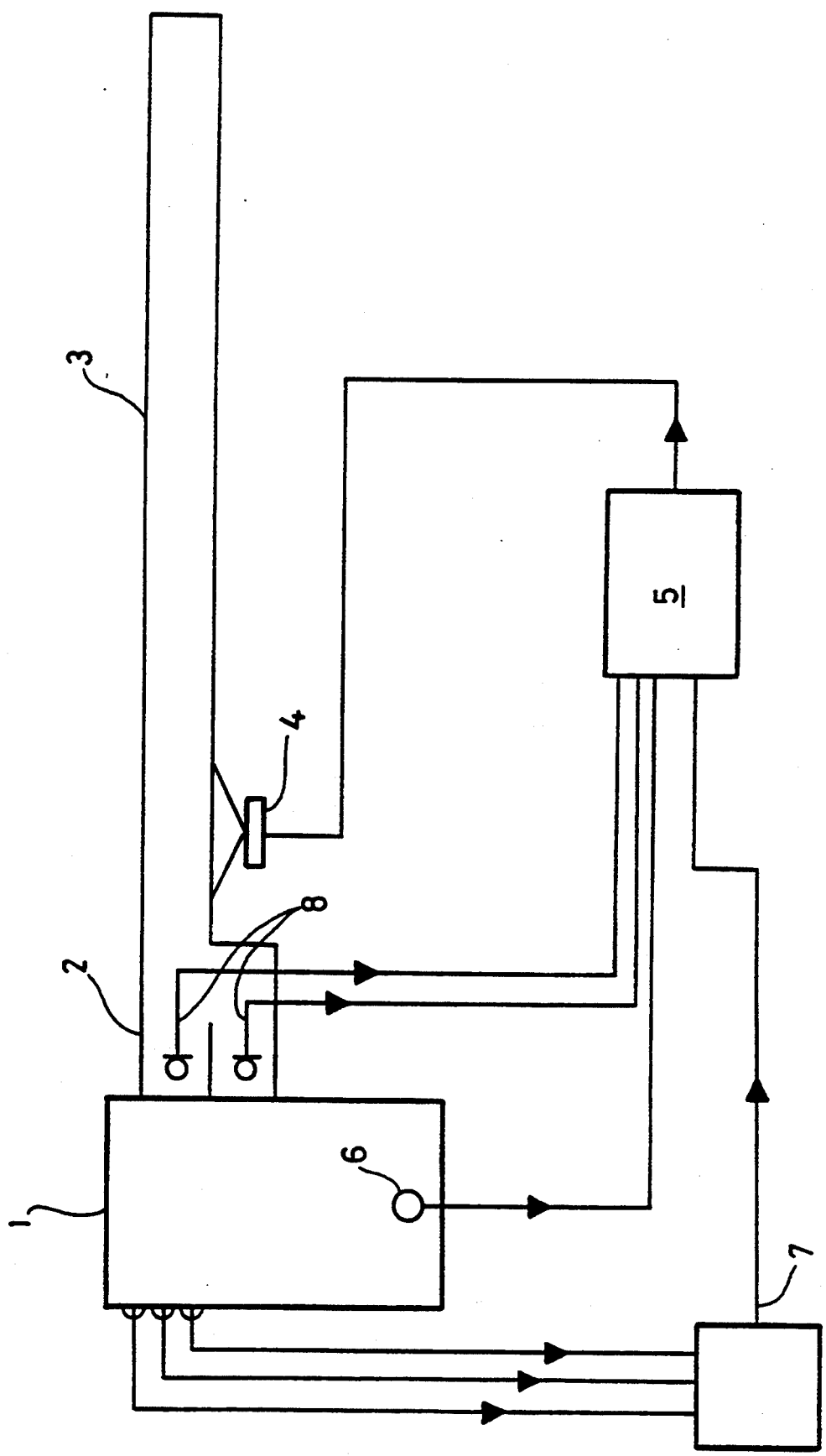

One embodiment of the invention is shown in FIG. 1. An engine 1, exhausts through a manifold 2 into an exhaust pipe 3. An actuator means 4 receives signals from a controller means 5. The actuator means can be any devices capable of altering the pressure in the exhaust system including electromagnetic, piezoelectric, magnetostrictive, hydraulic, or pneumatic devices. The actuator means may be mounted in the exhaust system, flush with its walls, or externally and linked to the exhaust system via ducts, membranes or enclosures. In order to control performance alone, the actuator means must comprise at least one actuator, and the first sensor means must comprise at least one sensor.

The actuator means can change the pressure in the exhaust system closer to the engine. Therefore, it can be made to change the pressure in the exhaust manifold in a controlled fashion. As an input to the controller means, there is a signal 7, that defines a desired measure of performance for the engine. The controller means adapts its drive to the actuator means based upon the performance measure in such a way as to keep that measure at a maximum as conditions change. The performance measure need not be a scalar quantity proportional, for example, to engine efficiency, but may be any signal that can be used by the controller means to achieve the desired improvement in performance. For example, the performance measure may be the optimum pressure as a function of time for a point in the exhaust manifold. The performance measure might be derived directly from a measurement of engine performance (eg fuel flow-rate, in-cylinder pressure, torque), or it might be derived indirectly via a measure of one or more engine parameters (eg speed, throttle position) in conjunction with a model of engine performance.

Optionally a sensor (or sensors) 8 that can be used to infer the pressure in the exhaust manifold may form part of the first sensor means and provide inputs to the controller means. In some cases, the performance measure of the engine may be derivable from this type of sensor alone, in which case it may be the only type of sensor in the first sensor means.

An additional sensor 6 that can be used to define the position of the engine in its cycle may also form an input to the controller. This signal can be used to synchronise the output of the controller to the engine's cycle.

When there is not provided second sensor means it is possible to control only the performance of the engine. However, the radiated sound could be reduced by a standard passive attenuator placed downstream of the actuator, thereby passively improving the noise performance. The passive attenuator may be a conventional silencer adapted to reduce high frequency noise, the control system of the invention being adapted to deal with low frequency noise.

b) Control of Performance and Noise Performance

Figure 2:
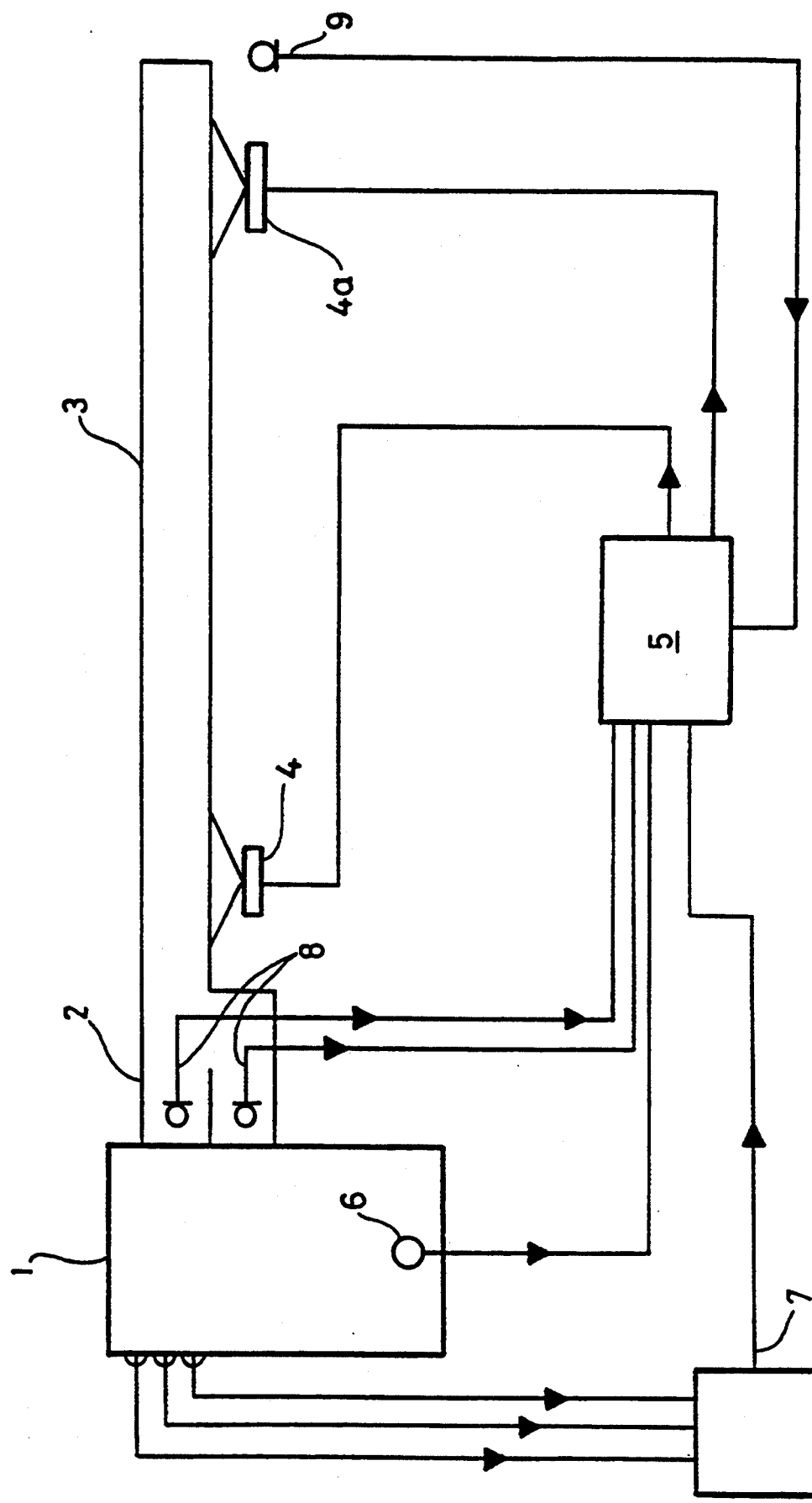

This embodiment of the invention is shown in FIG. 2. This embodiment is different from that of FIG. 1 wherein the actuator means is extended to include actuators 4a, and a second sensor means 9 that measures the pressure close to the exit of the exhaust is provided. Normally, only a single sensor would be required to measure pressure close to the exit, but a weighted sum of two or more sensors could be used. The sensor may be mounted inside or outside the exhaust further from the engine than the actuator means. In this embodiment in which performance and one component of the noise contributing to the noise performance are controlled independently, the first sensor means must comprise at least one sensor; the second sensor means must comprise at least one sensor; and the actuator means must comprise at least two actuators.

By extending the actuator means as described, it is possible not only to affect the pressure at the exhaust manifold, and hence improve engine performance, but also simultaneously to reduce or eliminate the sound radiated from the exit of the exhaust pipe thereby improving the noise performance.

The actuator layout can be chosen to optimise the system performance. In particular, there may be an advantage to placing one set of the actuators close to the engine, and the other near the exit. The actuators need not be of the same type.

c) Control of Performance and Noise Performance

Figure 3:
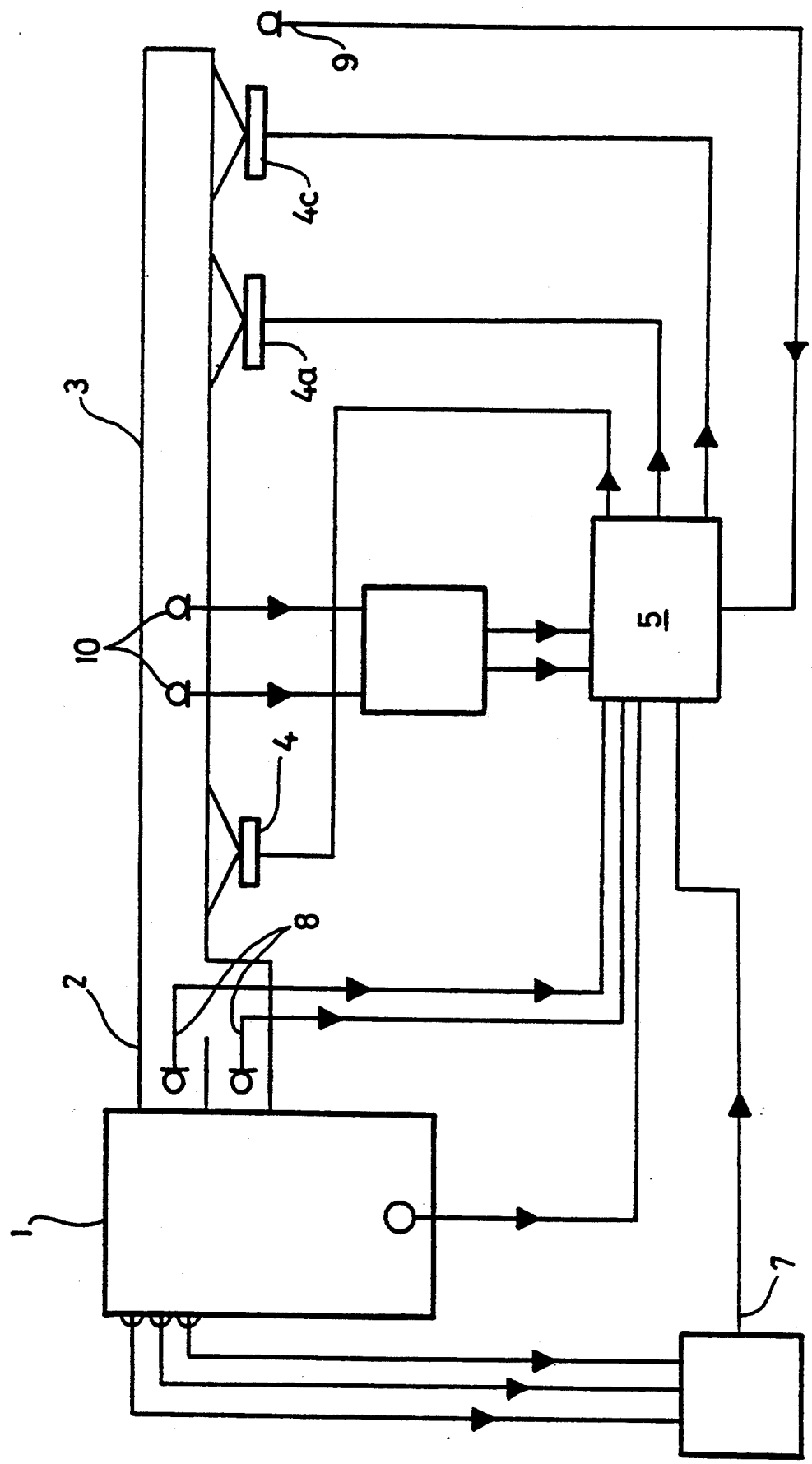

Another embodiment of the invention is shown in FIG. 3. The actuator means is extended from that of the previous embodiment by the addition of actuators 4c, and the second sensor means is extended by the addition of sensors 10. The purpose of these extensions is to be able to improve the noise performance still further by reducing the noise radiation due to the vibration of the walls of the exhaust, whilst maintaining the reduction in noise radiated from the exit of the exhaust and simultaneously optimising the engine performance. In order to do this, the first sensor means must comprise at least one sensor, the second sensor must comprise at least two sensors, and the actuators means must comprise at least three actuators.

One configuration in which the vibration of the walls of the exhaust can be reduced (and hence noise performance improved) is by choosing sensors 10 that can decompose the pressure field in the exhaust system into components propagating towards and away from the engine (ie into reflected and incident waves). This decomposition could be performed by at least two microphones, for example.

Signals related to these components then form inputs to the controller means. In exhaust systems that have discontinuities along their length (such as a catalytic converter or expansion chamber), it may be advantageous to have additional sensors to improve the decomposition of pressure field in the pipe. By driving the actuators with appropriate signals, it is possible to generate an arbitrary sound wave propagating towards the engine. This pressure fluctuation will affect the sound radiated from the walls of the exhaust system between the actuators and the engine. One way of reducing the sound radiated from the walls of the pipe (and hence to improve noise performance) is to absorb the incident sound wave, so that the reflected sound wave is as small as possible, another way is match the amplitudes of the incident and reflected sound waves so as to produce pressure 'nulls' at particular, advantageous points.

Alternatively, the sensors 10 might be sensors that monitor directly the vibration of the walls of the exhaust system. The controller means would then adjust its drives to the actuator means to reduce a measure of the vibration.

Alternatively, the sensors 10 might be sensors that measure directly the sound field outside the exhaust system. The controller means would then adjust its drives to the actuator means to reduce a measure of the external sound field.

The actuator layout can be chosen to optimise the system performance. In particular, there may be an advantage to placing one set of the actuators close to the engine, and two sets near the exit. The actuators need not be of the same type.

In all embodiments of the invention, there may be advantages to combining the active control system (comprising the first and second sensor means, the actuator means and the controller means) with additional passive attenuation measures. For example, the active control system will have a limited bandwidth of operation, and so passive measures that attenuate high frequency noise from the engine can be used in conjunction with the active system in order to improve noise performance at all frequencies of interest. The advantage of this combined active/passive system is that its operating and noise performances can be made better than with a purely passive system.

The role of the controller means in all embodiments of the invention is to optimize the operating performance and noise performance of the system, and to adapt to changes in the system and operating conditions to keep the performances at an optimum. The sensor signals that are used to define the performance of the engine are input to the controller means, which incorporates processing means associated with computing the performance, including a model of the engine performance. The model of the engine is incorporated into the adaption process of the controller means so that the model itself is maintained as the best predictor of engine performance, i.e. is updated with change in engine characteristics. The controller means, which may be a multichannel control system, can take any of the well-known forms appropriate to multiple input, multiple-output adaptive control. An example of such a system is described in 'A Stochastic Gradient Algorithm for Multichannel Active Sound Control'—by P. A. Nelson and S. J. Elliott in Adaptive Systems in Control and Signal Processing 1986. Also mentioned is the Proceedings of the 2nd IFAC Workshop pp 329–334 1987 published by Pergamon, and this document is incorporated here by reference.

d) Application to an Air Compressor

From the description of the embodiments of the invention described above it will be clear that the invention can be applied to other machines. For example, for the application to air compressors is equally well described by FIGS. 1, 2 and 3, where the compressor 1 is connected by a manifold 2 to the inlet or outlet systems 3. The active control system is the same as that described above except that the signal 7 is related to performance of the compressor. This may be mass flow rate of efficiency for example. Often the rotation rate of the compressor and geometry of the inlet or outlet are such that the sound in the system is not well described by plane waves. This means that additional sensors and actuators are required to control the additional degrees of freedom.

As employed herein the term outlet of a machine can be considered synonymous with the term inlet of a machine, where pressure changes occur in either, and can result in noise, and wherein changes in operation of the machine can result in measurable changes in the inlet and outlet pressures and pressure variations and wherein operation of the machine (including the noise generated thereby) can be altered by an actuator located at one or other or both of the said machine inlets and outlets. The invention is thus applicable equally to motors and compressors and pumps.

In the case of a machine whose operation can be described thermodynamically, the performance of the machine can be measured in relation to the thermodynamic performance but performance is not limited to this measure and factors such as efficiency, mass flow rate and power output may also be used as an indication of the performance of the machine.

We claim:

1. A control system for improving continuous dynamic control of the pressure in at least one of the outlet and inlet systems of a machine in order to control the performance of the machine, said system comprising:

actuator means generating sound adapted to vary the unsteady dynamic pressure in the said inlet and/or outlet system, at least one sensor means monitoring the operation of the machine and producing a signal indicative of the machine operation, control means responsive to the sensor signals and adapted to generate therefrom signals for driving the said actuator means, adaptive model means for relating machine performance to sensor input, and adaptive control means adapted to adjust machine performance according to said adaptive model means, whereby said control means operates adaptively to adjust the machine performance according to an algorithm to optimize the machine performance, said model means relating the sensor signals to the machine performance being incorporated into the adaptation process of the control means so that the model is updated with change in machine characteristics.

2. A control system as claimed in claim 1, wherein the adaptive control means is responsive to the sensor signals to generate therefrom unsteady signals fluctuating at a rate characteristic of the sound in the machine for driving the said actuator means.

3. A control system as claimed in claim 1 and further comprising:

second sensor means which generates a signal indicative of sound produced by at least one of the outlet and inlet systems, and wherein the control means is also responsive to the signals from the second sensor means, and is adapted by active feedback simultaneously to reduce noise generated by the machine as well as to improve the performance of the machine.

4. A control system as claimed in claim 3, wherein the second sensor means produces a signal related to the pressure inside the said at least one of the outlet and inlet systems, either directly or indirectly as by monitoring vibration of the walls of the said at least one of the outlet and inlet systems.

5. A control system as claimed in claim 1, wherein a synchronizing signal is generated and supplied to the control means to synchronize the operation of the control means in relation to the operation of the machine.

6. A control system as claimed in claim 5, wherein the sensor means includes pressure sensing means.

7. A control system as claimed in claim 1, wherein the adaptive control means is a multichannel control system.

8. A control system as claimed in claim 7, wherein the sensor means monitors the operation of the machine as by monitoring the operating parameters thereof.

9. A control system as claimed in claim 8 in combination with passive pressure control means, linked to at least one of the inlet and outlet systems.

10. A control system as claimed in claim 9, wherein the passive pressure control means comprises a conventional silencer adapted to reduce high frequency noise and the control system is adapted to reduce lower frequency noise.

11. A control system as claimed in claim 1, wherein the machine is an internal combustion engine.

12. A control system as claimed in claim 1, wherein the machine is a gas compressor.

13. A control system as claimed in claim 1, wherein the machine is a pump.

14. A control system as claimed in claim 1, wherein the machine is a turbo-machine.

* * * * *